United States Patent
Elnar

(10) Patent No.: US 7,025,079 B1
(45) Date of Patent: Apr. 11, 2006

(54) AIR BLEED-OFF VALVE

(76) Inventor: Joseph G. Elnar, 2954 Rubidoux Blvd., Riverside, CA (US) 92509

(*) Notice: Subject to any disclaimer, the term of this patent is extended or adjusted under 35 U.S.C. 154(b) by 15 days.

(21) Appl. No.: 10/844,885

(22) Filed: May 14, 2004

(51) Int. Cl.
*F16K 24/04* (2006.01)
(52) U.S. Cl. .................................... 137/199; 4/541.3
(58) Field of Classification Search ............... 4/541.3; 137/199
See application file for complete search history.

(56) References Cited

U.S. PATENT DOCUMENTS

| | | | | |
|---|---|---|---|---|
| 2,725,071 A | * | 11/1955 | McKillop | 137/202 |
| 2,776,630 A | | 1/1957 | Fagan | |
| 2,847,149 A | | 8/1958 | Ainsworth | |
| 2,908,282 A | * | 10/1959 | Maisch | 137/199 |
| 3,197,069 A | | 7/1965 | Brunson | 222/72 |
| 3,474,735 A | | 10/1969 | Gilmore | |
| 3,575,521 A | | 4/1971 | Porter et al. | 415/27 |
| 3,722,180 A | | 3/1973 | Boucher et al. | 55/46 |
| 3,770,001 A | * | 11/1973 | Davis | 137/202 |
| 4,759,476 A | * | 7/1988 | Pasbrig | 137/199 |
| 5,137,061 A | | 8/1992 | Deininger et al. | 141/18 |
| 5,211,200 A | * | 5/1993 | Cassidy | 137/199 |
| 5,263,459 A | | 11/1993 | Talaski | 123/516 |
| 5,526,538 A | * | 6/1996 | Rainwater | 4/541.3 |
| 6,003,167 A | | 12/1999 | Nehring | 4/541.1 |

* cited by examiner

*Primary Examiner*—Kevin Lee
(74) *Attorney, Agent, or Firm*—Kenneth L. Green; Edgar W. Averill, Jr.

(57) ABSTRACT

An automatic air bleed valve which allows air to escape from water lines. Allowing air to thus escape, prevents pump cavitation and/or air in the heater. The air bleed valve is positioned between a pump and the heater, and is higher than the heater, and no higher than the water level in the spa. The air bleed valve comprises a vertically disposed cylinder containing a piston and having a valve bottom, a valve inlet proximal to the valve bottom, valve top, and a valve outlet proximal to the valve top. The piston moves vertically in the cylinder. While water is present in the cylinder, the piston raises and cooperates with a seal to prevent a flow of water through the valve. While air is present in the cylinder, the piston drops and allows the air to flow past the piston to the valve outlet.

21 Claims, 6 Drawing Sheets

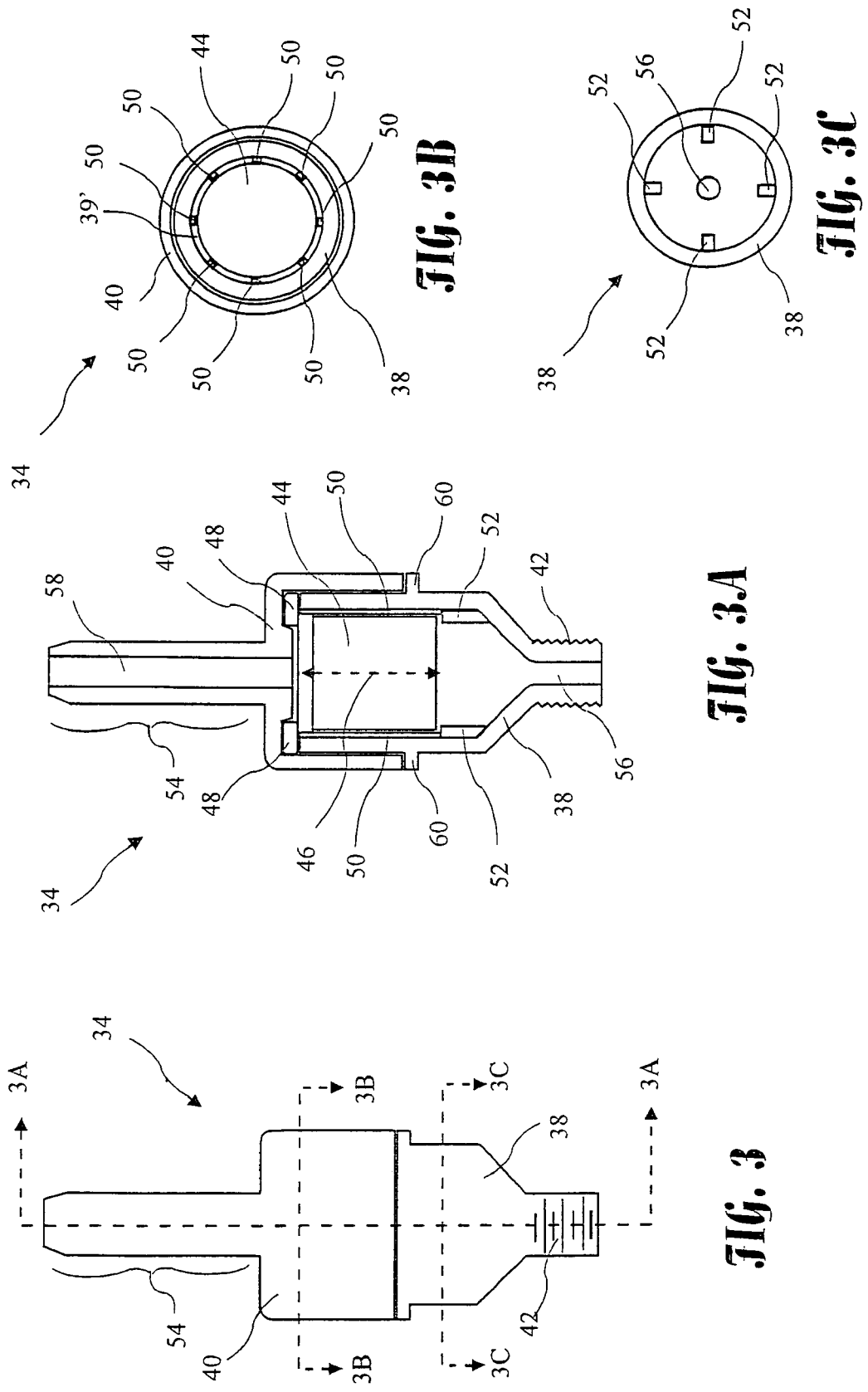

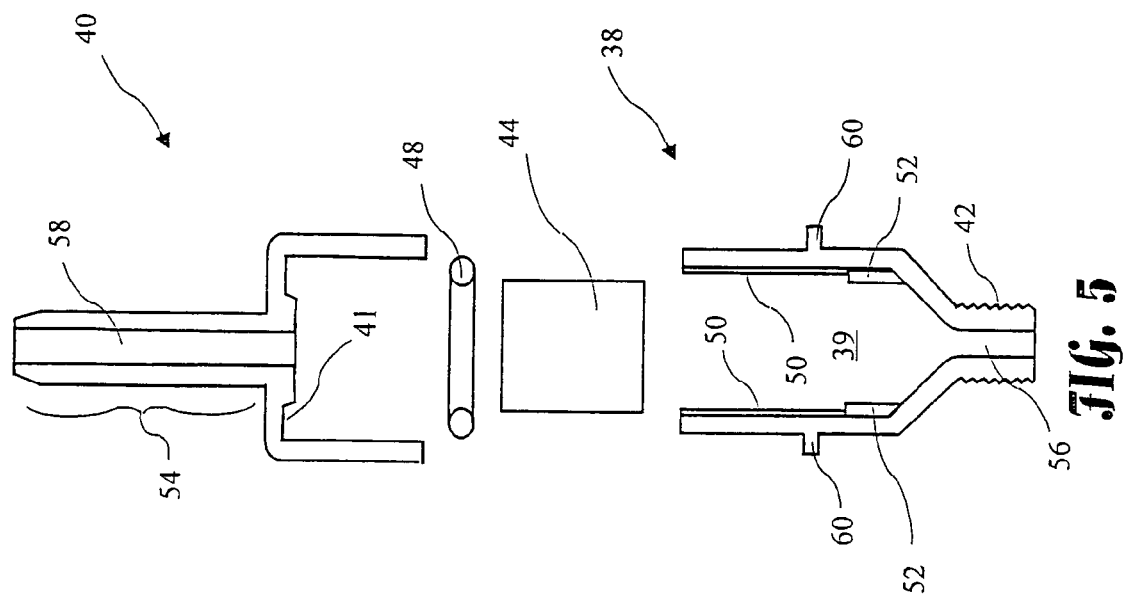
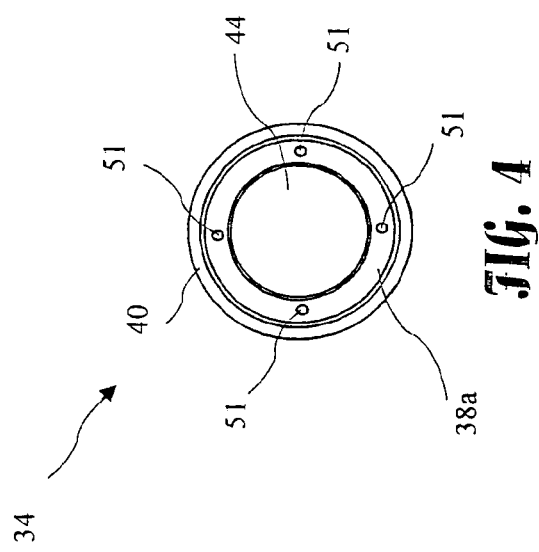

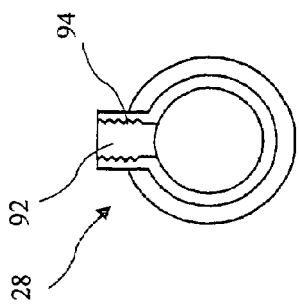
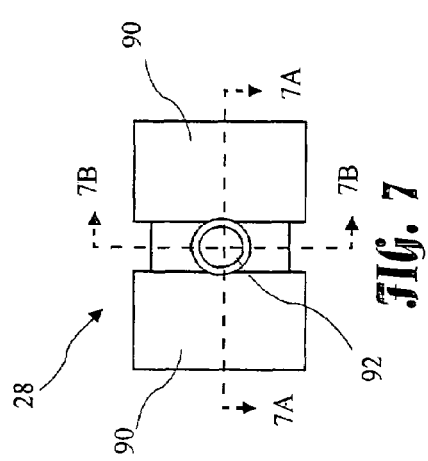
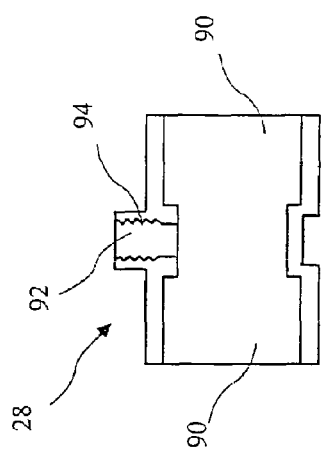
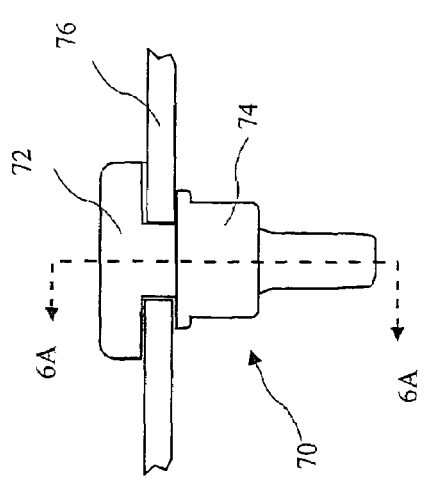
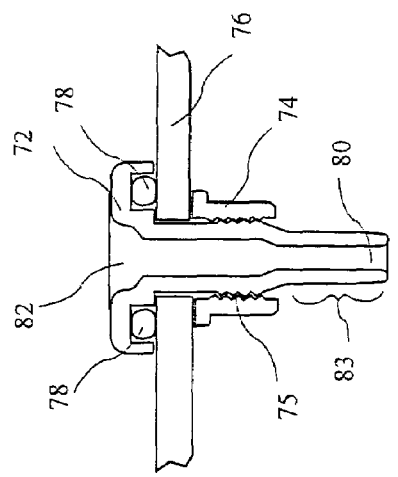

AIR BLEED-OFF VALVE

BACKGROUND OF THE INVENTION

The present invention relates to an automatic air bleed-off valve, and more particularly to an air bleed-off valve suitable for use with a spa.

Spas include a pump and heater to provide a flow of heated water to jets as shown in prior art FIG. 1. The pump sucks water through drains and pumps the water through the heater to jets mounted in spa walls. If sufficient air enters the pump, and is pumped through the heater, overheating and damage to the heater may result. Many modern spas include at least two drains as a safety requirement to prevent a user from being held against a drain by pump suction. Because of the additional drains, there is a greater likelihood that one drain will allow air to enter the system and reach the heater. There is thus a need for a valve to automatically bleed off air before the air can reach and damage the heater.

U.S. Pat. No. 3,197,069 issued Jul. 27, 1965 for "System for Dispensing Liquid Having a Meter, an Air Eliminator, and a Back Pressure Valve," describes an air eliminator used with a back pressure valve for use with a fuel delivery truck. The air eliminator of the '069 patent includes a float attached to a valve. Unfortunately, the float and valve arrangement requires at least twenty five pounds of back pressure to properly function, and creating artificial back pressure in a spa would reduce the effect of the jets.

U.S. Pat. No. 5,263,459 issued Nov. 23, 1993 for "Fuel Delivery with Self-Priming Fuel Pump," describes an air/vapor purge valve for purging air and/or vapor from a fuel line. The air/vapor purge valve of the '459 patent is downward pointing, and is spring loaded in an open position.

U.S. Pat. No. 6,003,167 issued Dec. 21, 1999 for "Apparatus for Eliminating Gas from a Fluid Piping System," describes a system for removing gas from a recirculating spa or hydrotherapy tub to prevent gas from being trapped in a pump housing. The gas is removed by routing pipe to a vent above the pump, however, the '167 patent does not describe a valve or cooperation of a valve with a heater and does not suggest that the vent will remove air from a pump and heater combination in a spa.

BRIEF SUMMARY OF THE INVENTION

The present invention addresses the above and other needs by providing an automatic air bleed valve which allows air to escape from water lines. Allowing air to thus escape, eliminates pump cavitation and/or air in the heater, and the automatic air bleed valve allows air to escape even if the pump is not running. The air bleed valve is positioned between a pump and the heater, and is higher than the heater, and no higher than the water level in the spa. The air bleed valve comprises a vertically disposed cylinder containing a piston and having a valve bottom, a valve inlet proximal to the valve bottom, a valve top, and a valve outlet proximal to the valve top. The piston moves vertically in the cylinder. While water flow is present in the spa piping system, the piston raises and cooperates with a seal to prevent a flow of water through the valve. While there is no water flow in the spa piping system, the piston drops and allows the air to flow past the piston to the valve outlet.

In accordance with one aspect of the invention, there is provided an automatic air bleed valve comprising an inlet proximal to a valve bottom, an outlet proximal to a valve top, a vertically aligned cylindrical interior in fluid communication with the inlet and the outlet, and a cylindrical piston residing in the interior between the inlet and the outlet. The piston has a low position and a high position, and wherein the piston resides in the low position in the absence of a flow through the cylinder, solely due to the influence of gravity on the piston. The interior includes ribs for vertically aligning the piston in the interior and for forming a bypass for allowing air to pass around the piston, and a seal proximal to the outlet. An air flow into the valve inlet passes between the piston and the seal and out the valve outlet, and a water flow into the valve inlet urges the piston against the seal.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 shows a detailed view of the automatic air bleed valve.

FIG. 3A shows a cross-sectional view of the automatic air bleed valve taken along line 3A—3A of FIG. 3.

FIG. 3B shows a cross-sectional view of the automatic air bleed valve taken along line 3B—3B of FIG. 3, showing alignment ribs.

FIG. 3C shows a cross-sectional view of the automatic air bleed valve taken along line 3C—3C of FIG. 3, showing stop ribs.

FIG. 4 shows a second embodiment of the cross-sectional view taken along line 3B—3B of FIG. 3, including bypass ports.

FIG. 5 shows parts used to construct the automatic air bleed valve.

FIG. 6 shows a hose connector suitable for use with the automatic air bleed valve.

FIG. 6A shows a cross-sectional view of the hose connector taken along line 6A—6A of FIG. 6.

FIG. 7 shows a Tee used to connect the automatic air bleed valve to a line connecting a pump and a heater.

FIG. 7A shows a cross-sectional view of the Tee taken along line 7A—7A of FIG. 7.

FIG. 7B shows a cross-sectional view of the Tee taken along line 7B—7B of FIG. 7.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
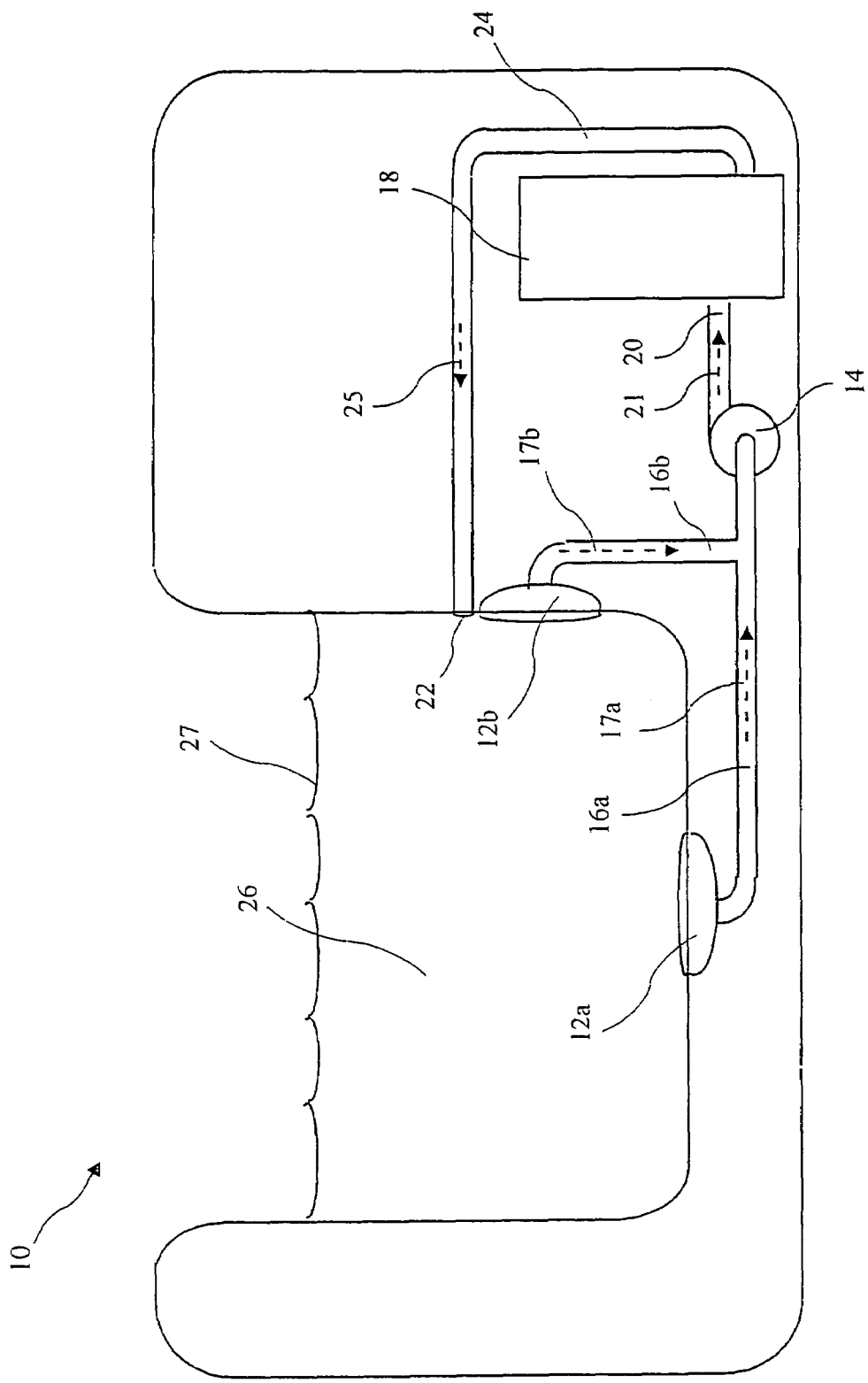
FIG. 1 is a prior art spa having a pump and heater.

A prior art spa 10 is shown in FIG. 1. The spa 10 includes drains 12a and 12b. The drains 12a, 12b are in fluid communication with a pump 14 through first lines 16a and 16b respectively carrying flows 17a and 17b respectively. A heater 18 is in fluid communication with the pump 14 through second line 20 carrying second flow 21. The heater 18 is in fluid communication with at least one jet 22 through line 24 carrying a third flow 25. Water 26 is thereby circulated and heated. If air enters either drain 12a or 12b, and is pumped into the heater 18, damage to the heater 18 may result.

Figure 2:
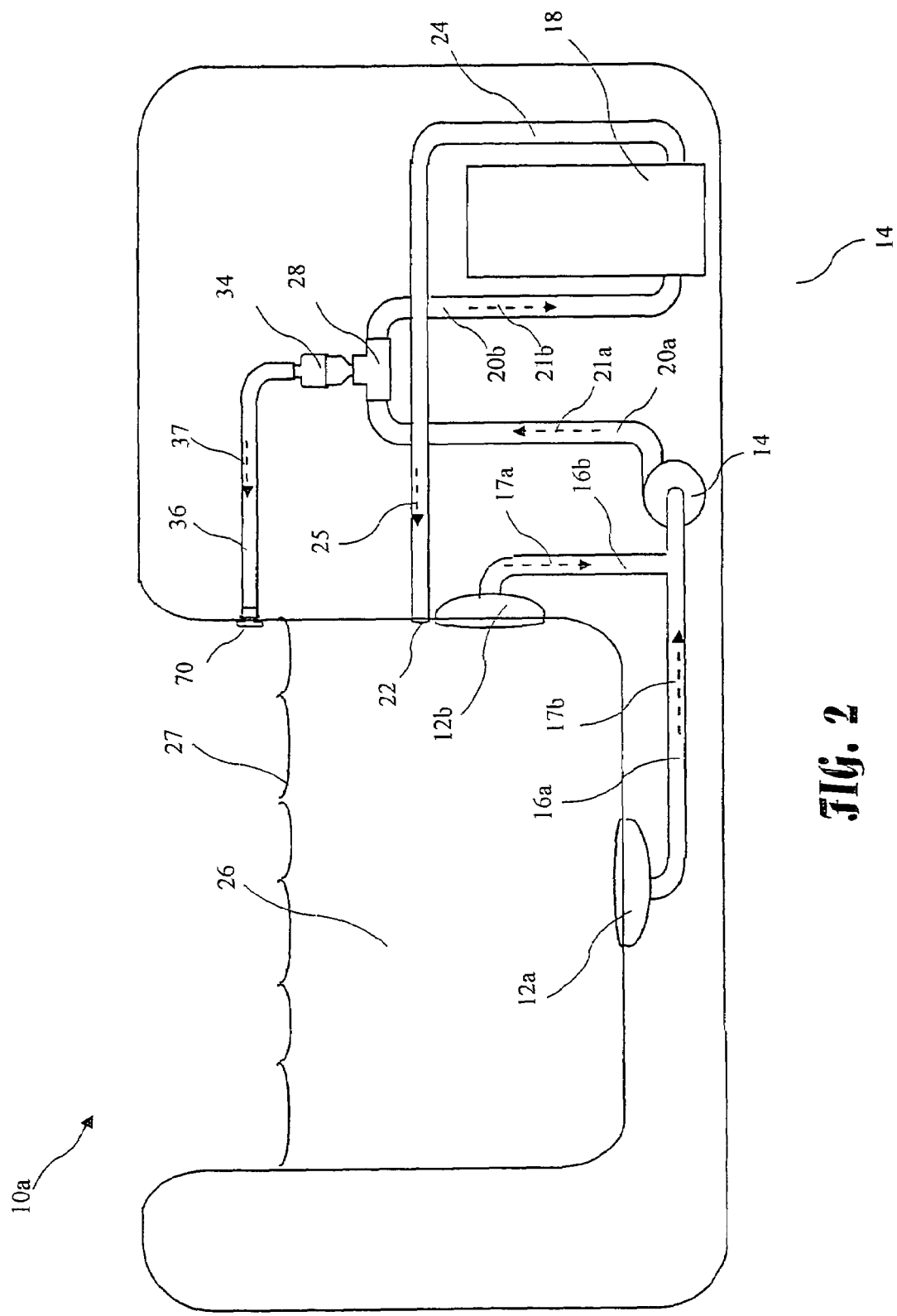
FIG. 2 depicts a spa including an automatic air bleed valve according to the present invention.

An improved spa 10a is shown in FIG. 2 including an automatic air bleed valve 34 according to the present invention. The automatic air bleed valve 34 is connected to a Tee 28 residing between the pump 14 and heater 18. A fourth line 20a carrying a fourth flow 21a connects the automatic air bleed valve 34 to the pump 14, and a fifth line 20b carrying a fifth flow 21a connects the heater 18 to the automatic air bleed valve 34. A hose 36 carries a sixth flow 37 from the automatic air bleed valve 34 to a hose connector 70 mounted to the wall of the spa 10a. The automatic air bleed valve 34 is preferably positioned above the heater and not above a water line 27. The hose connector 70 is mounted above the water line 27.

A detailed view of the exterior of the automatic air bleed valve 34 is shown in FIG. 3. The automatic air bleed valve 34 has a valve body comprising a valve base 38 and a valve cap 40. The valve base 38 includes male threads 42 extending downward, which threads 42 are preferably ¼–18 National Pipe Taper (NPT) threads. The valve cap 40 includes a hose connector portion 54 extending upward, which hose connector is approximately ⅜ inches in diameter.

A cross-sectional view of the automatic air bleed valve 34 taken along line 3A—3A of FIG. 3 is shown in FIG. 3A. The automatic air bleed valve 34 has an inlet 56 at the bottom of the automatic air bleed valve 34, and an outlet 58 at the top of the automatic air bleed valve 34. The valve base 38 has a vertically aligned cylindrical interior 39 (see FIG. 5) in fluid communication with the inlet 56 and the outlet 58. The interior 39 is preferably approximately one inch in diameter and has an interior wall 39'. An O-ring 48 resides at the top of the cylindrical interior 39 in a recess 41 (see FIG. 5) in the valve cap 40. The O-ring preferably has a cross-section of approximately 0.14 inches. The valve cap 40 is urged against a flange 60 on the exterior of the valve base 38, and the O-ring 48 is somewhat squeezed between a top edge of the valve base 38 and the recess 41. The valve cap 40 is preferably sonic welded to the valve base 38. Alignment ribs 50 and stop ribs 52 intrude into the interior 39 from the interior wall 39'. A cylindrical piston 44 resides in the interior 39, which piston 44 is aligned by the alignment ribs 50, and is limited in downward vertical travel (i.e., stroke) by stop ribs 52. An arrow 46 indicates the motion of the piston 44. The piston 44 is preferably made from a material with greater density than water, and is more preferably made from 316 stainless steel.

A cross-sectional view of the automatic air bleed valve 34 taken along line 3B—3B of FIG. 3 is shown in FIG. 3B. The ribs 50 preferably comprise between four and twelve ribs 50, and more preferably comprise eight ribs 50. The ribs 50 preferably intrude between approximately 0.01 inches and approximately 0.03 inches into the interior 39, and more preferably intrude approximately 0.023 inches from the interior wall 39' into the interior 39. The automatic air bleed valve 34 includes a bypass between the piston 44 and the interior wall 39' large enough to allow air to flow through the automatic air bleed valve 34 without applying enough upward force on the piston 44 to urge the piston 44 against the O-ring 48 to stop the flow of air. The bypass is not large enough to allow a substantial water flow through the automatic air bleed valve 34 before the pressure against the bottom of the piston 44 forces the piston 44 upwardly against the O-ring 48, thereby closing the automatic air bleed valve 34. Thus, air may flow around the piston 44 when water flow in the spa piping is off. The alignment ribs 50 create a gap between the valve interior wall 39' and the piston 44, thereby creating the bypass.

A cross-sectional view of the automatic air bleed valve 34 taken along line 3C—3C of FIG. 3 is shown in FIG. 3C. The stop ribs 52 preferably comprise four stop ribs 52, and intrude approximately 0.1 inches into the interior 39.

While the embodiment described above has a bypass 39' formed by the ribs 50, the interior 39, and the piston 44, an automatic air bleed valve having a different bypass is intended to come within the scope of the present invention. For example, ports 51 shown in FIG. 5 may be provided to carry a flow of air past the piston 44, which ports 51 direct the flow of air into the interior 39 below the O-ring 48.

An exploded view of the automatic air bleed valve 34 is shown in FIG. 5.

A detailed view of the hose connector 70 is shown in FIG. 6. The hose connector 70 is adapted to mount to a spa wall 76 and comprises a connector body 72 and a connector nut 74.

A cross-sectional view of the hose connector 70 taken along line 6A—6A of FIG. 6 is shown in FIG. 6A. A connector seal 78 is squeezed between the connector body 72 and the spa wall 76. The connector nut 74 is preferably attached to the connector body 72 by second threads 75. The line 36 (see FIG. 2) is attached to a second hose connector portion 83, and water from the automatic air bleed valve 34 flows into a connector inlet 80, and water flows into the spa 10a from the connector outlet 82. The hose connector 70 is preferably made from PVC.

A detailed description of the Tee 28 (see FIG. 2) is shown in FIG. 7. Coupling ends 90 are sized to connect to the lines 20a, 20b, and are preferably 2 inch couplings. A port 92 is adapted to connect to the automatic air bleed valve 34. The Tee 28 is preferably made from PVC.

A cross-sectional view of the Tee 28 taken along line 7A—7A of FIG. 7 is shown in FIG. 7A. The port 92 includes female third threads 94, which threads 94 are preferably ¼–18 NPT threads. A second cross-sectional view of the Tee 28 taken along line 7B—7B of FIG. 7 is shown in FIG. 7B, showing the Tee 28 as a substantially round coupling.

Figure 8:
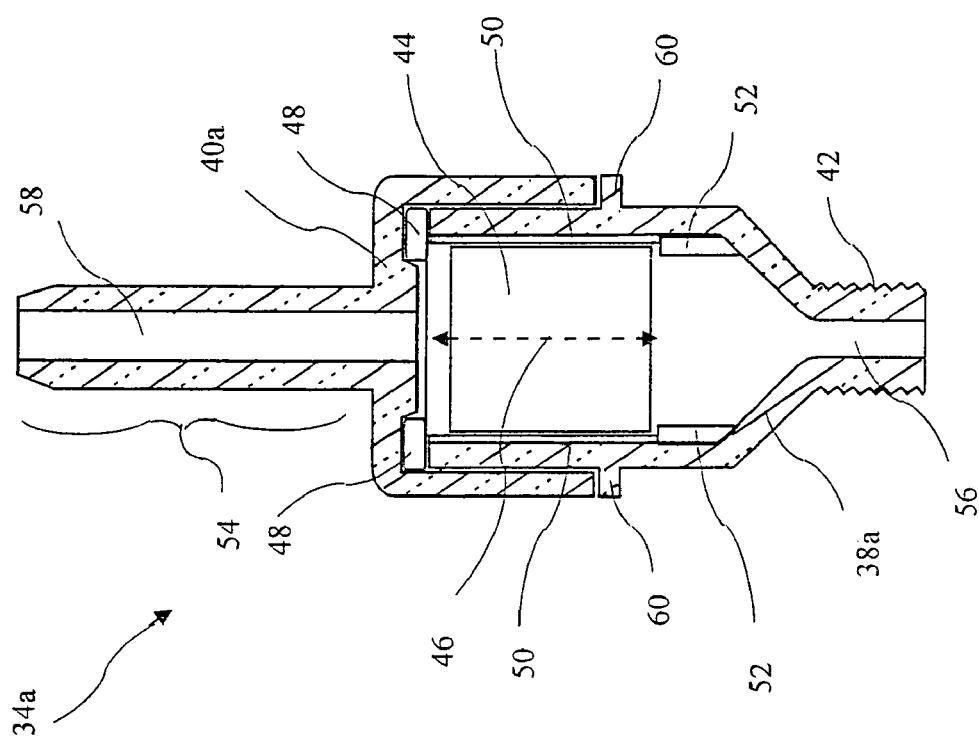
FIG. 8 shows an embodiment with transparent valve base and valve cap.

A view of an automatic air bleed valve 34a with transparent valve base 38a and valve cap 40a is shown in FIG. 8. The use of transparent materials allows viewing of the operation of the valve.

While the invention herein disclosed has been described by means of specific embodiments and applications thereof, numerous modifications and variations could be made thereto by those skilled in the art without departing from the scope of the invention set forth in the claims.

I claim:

1. An air bleed valve comprising:
   a valve body comprising:
     an inlet proximal to a valve body bottom;
     an outlet proximal to a valve body top; and
     a vertically aligned interior in fluid communication with the inlet and the outlet;
   a piston residing in the interior between the inlet and the outlet;
   a seal residing in the interior and above the piston;
   stop ribs limiting the downward vertical travel of the piston; and
   a bypass for allowing air to pass around the piston and restricting a flow of water around the piston, wherein, an air flow into the valve inlet passes between the piston and the interior and past the seal and out the outlet, and a water flow into the valve inlet urges the piston against the seal thereby closing the air bleed valve.

2. The valve of claim 1, wherein:
the piston has a low position and a high position; and
the piston resides in the low position in the absence of a flow through the cylinder, solely due to the influence of gravity on the piston.

3. The valve of claim 1, wherein the interior includes ribs for vertically aligning the piston in the interior.

4. The valve of claim 3, wherein the bypass is defined by the ribs, the interior, and the piston.

5. The valve of claim 3, wherein the ribs intrude between approximately 0.01 inches and approximately 0.03 inches into the interior.

6. The valve of claim 5, wherein the ribs intrude approximately 0.023 inches into the interior.

7. The valve of claim 3, wherein the ribs comprise between four and twelve ribs.

8. The valve of claim 3, wherein the ribs comprise eight ribs.

9. The valve of claim 1, wherein the seal is an O-ring.

10. The valve of claim 1, wherein the interior is a cylindrical interior.

11. The valve of claim 1, wherein the stop ribs intrude approximately 0.1 inches into the interior.

12. The valve of claim 1, wherein:
the valve body comprises a valve base and a valve cap; and
the interior resides substantially within the valve base.

13. The valve of claim 12, wherein the valve cap is attached to the valve base by sonic welding.

14. The valve of claim 1, wherein the valve body is made from PVC.

15. The valve of claim 1, wherein the valve body is made from a transparent material.

16. An improved spa having a drain, a pump receiving a first flow from the drain, a heater receiving a second flow from the pump, and at least one jet receiving a third flow from the heater, the improvement comprising:
an air bleed valve in fluid communication with the second flow, the valve comprising:
an inlet proximal to a valve bottom;
an outlet proximal to a valve top;
a vertically aligned interior in fluid communication with the inlet and the outlet;
a piston residing in the interior between the inlet and the outlet;
a seal disposed in the interior and above the piston; and
a bypass for allowing air to pass around the piston,
wherein, an air flow into the valve inlet passes between the piston and the seal and out the valve outlet, and a water flow into the valve inlet urges the piston against the seal.

17. The improved spa of claim 16, wherein:
a Tee is connected at an intermediate point of the second flow;
the intermediate point is located higher than the heater inlet and no higher than a spa water level; and
the air bleed valve is connected to the Tee.

18. The improved spa of claim 16, wherein:
the piston has a low position and a high position; and
the piston resides in the low position in the absence of a flow through the cylinder, solely due to the influence of gravity on the piston.

19. The improved spa of claim 16, wherein the interior includes ribs for vertically aligning the piston and the bypass is defined by the ribs, the interior, and the piston.

20. The improved spa of claim 19, wherein the bypass is defined by the ribs, the interior, and the piston.

21. An automatic air bleed valve comprising:
a valve body comprising:
an inlet proximal to a valve body bottom;
an outlet proximal to a valve body top; and
a vertically aligned cylindrical interior in fluid communication with the inlet and the outlet;
a cylindrical piston residing in the interior between the inlet and the outlet, wherein the piston has a low position and a high position, and wherein the piston resides in the low position in the absence of a flow through the cylinder, solely due to the influence of gravity on the piston;
ribs for vertically aligning the piston in the interior and forming a bypass for allowing air to pass around the piston and restricting a flow of water around the piston;
stop ribs limiting the downward vertical travel of the piston; and
a seal residing in the interior and above the piston,
wherein, an air flow into the valve inlet passes between the piston and the seal and out the valve outlet, and a water flow into the valve inlet urges the piston against the seal.

* * * * *